United States Patent
Kirjavainen et al.

(10) Patent No.: US 6,178,820 B1
(45) Date of Patent: Jan. 30, 2001

(54) SENSOR FOR MEASURING ACCELERATION AND SOUND PRESSURE

(75) Inventors: Kari Kirjavainen, Espoo; Jukka Lekkala; Hannu Nykänen, both of Tampere; Seppo Uosukainen, Helsinki, all of (FI)

(73) Assignee: VTT, Espoo (FI)

(*) Notice: Under 35 U.S.C. 154(b), the term of this patent shall be extended for 0 days.

(21) Appl. No.: 09/308,323
(22) PCT Filed: Nov. 19, 1997
(86) PCT No.: PCT/FI97/00706
§ 371 Date: Jun. 8, 1999
§ 102(e) Date: Jun. 8, 1999
(87) PCT Pub. No.: WO98/22785
PCT Pub. Date: May 28, 1998

(30) Foreign Application Priority Data

Nov. 20, 1996 (FI) .......................................... 964637

(51) Int. Cl.[7] .................................................. G01H 11/08
(52) U.S. Cl. .............................. 73/647; 310/329; 310/334; 73/652
(58) Field of Search ............................. 73/646, 647, 652, 73/654; 310/334, 329, 338, 369

(56) References Cited

U.S. PATENT DOCUMENTS

| | | | |
|---|---|---|---|
| 3,651,353 | * | 3/1972 | Hugli et al. .......................... 310/334 |
| 4,604,544 | * | 8/1986 | Konomi et al. ...................... 310/338 |
| 4,654,546 | | 3/1987 | Kirjavainen .......................... 307/400 |
| 5,325,437 | | 6/1994 | Doi et al. . |
| 5,434,371 | | 7/1995 | Brooks . |
| 5,519,637 | | 5/1996 | Mathur . |

FOREIGN PATENT DOCUMENTS

| | | |
|---|---|---|
| 43 42 169 | 6/1995 | (DE) . |
| 44 10 794 | 10/1995 | (DE) . |
| 2 235 533 | 3/1991 | (GB) . |
| 8-184608 | 7/1996 | (JP) . |
| 1808024 | 4/1993 | (SU) . |

\* cited by examiner

Primary Examiner—John E. Chapman
(74) Attorney, Agent, or Firm—Young & Thompson

(57) ABSTRACT

The invention relates to a sensor for measuring acceleration and sound pressure, the sensor comprising a first pressure sensitive film (2) for measuring pressure (P) and second pressure sensitive film (5) having a mass (6) disposed thereon for measuring acceleration (A). The films are arranged concentrically in the same plane, so that pressure and acceleration are measured at the same point, thereby avoiding a phase difference between the two measurements.

6 Claims, 1 Drawing Sheet

SENSOR FOR MEASURING ACCELERATION AND SOUND PRESSURE

Figure 1:
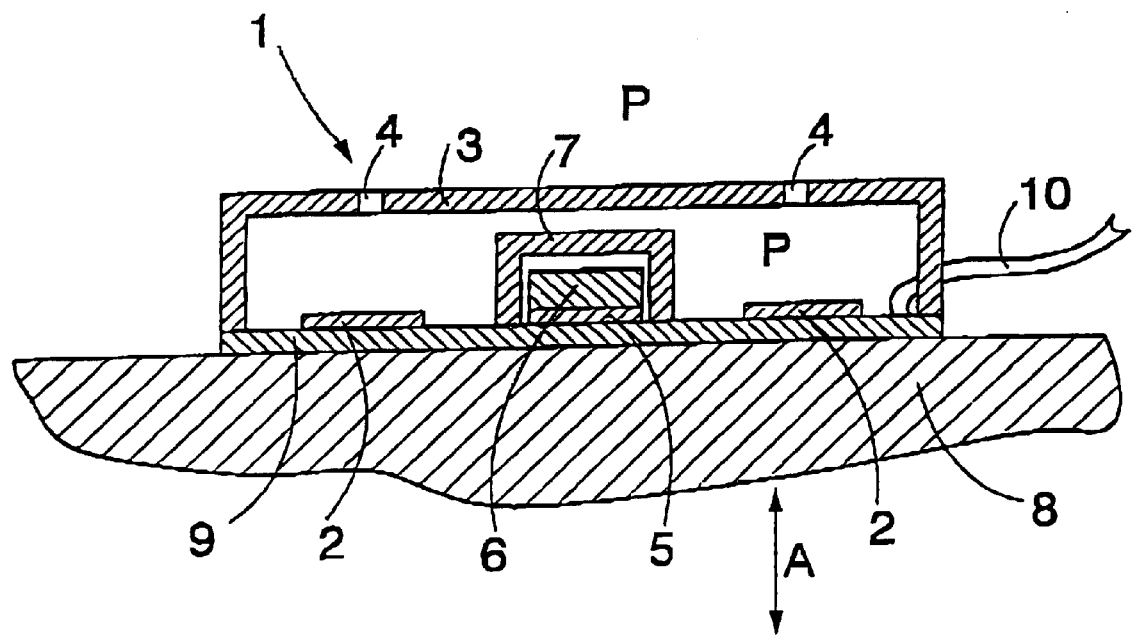

The invention relates to a sensor for measuring acceleration and sound pressure, the sensor separately comprising means for measuring the acceleration of a surface and means for measuring the sound pressure affecting the surface.

Extremely accurate values of the magnitudes of the acceleration and the pressure affecting a surface are needed e.g. in an application which actively attenuates sound and oscillation caused by nose. Said values are needed for controlling the means, i.e. actuators, generating counter-oscillation. Since the signals to be measured are wave-formed, completely reliable measurement results are extremely difficult to obtain, since a phase difference can be present at the time of measurement in two different measurements, the phase difference excessively interfering with the final result.

German Publication No. 4,342,169 discloses an electro-mechanical transformer operating as e.g. a microphone. Said transformer comprises a film for emitting a signal which is proportional to the sound pressure and/or surface acceleration. However, the transformer cannot be used in accurate sound attenuation applications since the sound pressure and acceleration signals cannot be distinguished one from the other.

It is the object of the present invention to provide a sensor for measuring acceleration and sound pressure accurately and reliably.

The sensor of the invention is characterized in that the means for measuring the acceleration and the means for measuring the sound pressure are arranged substantially concentrically and substantially in the same plane.

An essential idea of the invention is that the means for measuring acceleration and the means for measuring sound pressure are arranged concentrically in the same plane. The idea of a preferred embodiment in that the means for measuring pressure is circular and the means for measuring acceleration is arranged in the middle of said circle. The pressure sensor is most preferably formed of pressure-sensitive film having flat gas bubbles and a metal coating on at least one side, a permanent electric charge being formed in the film, the sensor emitting an electric signal proportional to the pressure. Furthermore, the acceleration sensor is preferably made of similar material by adding a mass on top of it and arranging the acceleration sensor in such a way that pressure changes do not affect it, but the movement of the surface to be measured causes the mass disposed upon the material to emit a signal.

It is an advantage of the invention that one of the measuring means, arranged concentrically in the same plane, measures pressure and the other measures acceleration from the same place at the same time, whereby no error caused by a phase error can affect the measurement result, i.e. the measurement is reliable and accurate. When the same material is mainly used in the acceleration and pressure measurement sensors, the sensor production technique becomes easy. By arranging the acceleration sensor such that a mass is placed on the pressure-sensitive film, the resulting acceleration sensor is not substantially affected by lateral movements.

Figure 2:
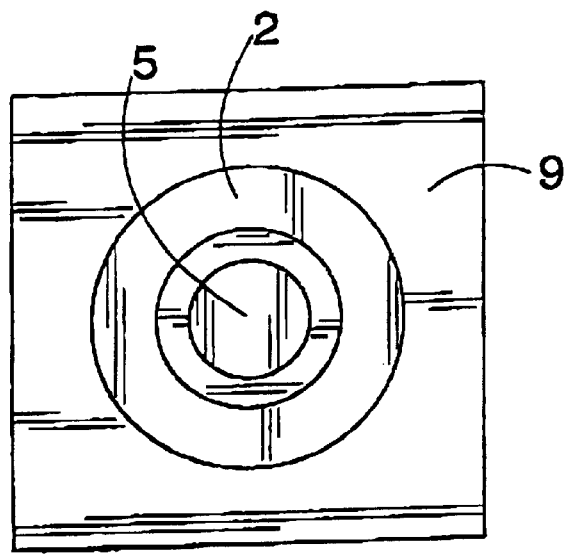

The invention will be described in more detail in the attached drawings, in which FIG. 1 is a schematic sectional side view the sensor of the invention, and FIG. 2 is a top view of the sensor of FIG. 1.

FIG. 1 shows a sensor 1 for measuring acceleration and sound pressure. The means for measuring the sound pressure is a pressure-sensitive film 2. The film 2 comprises flat gas bubbles and has a metal coating on at least one side, and a permanent electric charge, i.e. what is known as an electret charge, is formed in it. As pressure P affects said film, the film emits an electric signal proportional to the pressure, i.e. it is a piezoelectric sensor. The mass of the film 2 is so small that its movement does not substantially generate a signal, essentially all signals being generated by a change in the pressure P affecting the film 2. The film 2 is encased in a housing 3 provided with holes 4 through which pressure changes, i.e. in practice, changes in sound pressure, affect the film 2.

The film 2 is circular and the means for measuring acceleration are arranged in its midpoint. The means for measuring acceleration comprise a pressure-sensitive film 5 and a mass 6 disposed on top of the film. The film 5 is of similar material as the film 2. The film 5 and the mass 6 are encased in a protective casing 7 for preventing a change in sound pressure from affecting the film 5. Consequently, substantially only the weight of the mass 6 affects the film 5, whereby with the surface of a body 8 moving in the direction shown by arrow A, the weight of the mass 6 affects the film 5, whereby the acceleration of the surface of the body 8 in the directions of arrow A can be measured. The protective casing 7 may comprise very small holes or pores through which the air pressure inside the protective casing 7 is allowed to even out, the holes or pores being so small that the sound pressure P cannot affect the film. The acceleration sensor of FIG. 1 is not substantially affected by lateral acceleration. The acceleration sensor and the sound pressure sensor are separate, allowing the sound pressure and surface acceleration to be measured separately. Furthermore, the acceleration sensor and the sound pressure sensor are substantially in the same plane.

The films 2 and 5 and the housing 3 and the protective casing 7 are secured to a base plate 9. Microcircuits for amplifying signals, for example, can be arranged in the base plate 9. The measured signals are led via a connecting wire 10 to be further utilized. The base plate 9 may also be of silicon substrate, whereby a circuit comprising the electronics necessary for signal processing can be integrated therein. The electronics of the sensor 1 can also be adapted to form the mass 6.

The sensor can be dimensioned very small, e.g. with a diameter of about 10 mm or even less and a thickness of e.g. about 1 mm or even less. Since the film 5 is very light and sensitive, the mass 6 does not have to be heavy, but a mass of e.g. 0.1 g or less is adequate.

FIG. 2 is a top view of the sensor of FIG. 1. The numbering of FIG. 2 corresponds to that of FIG. 1. For the sake of clarity, the housing 3, the protective casing 7, and the mass 6 are not shown in FIG. 2. As can be seen from FIG. 2, the film 2 is annular and the film 5 is arranged substantially in its middle.

Acoustic surface intensity measurements are important applications of the sensor 1. A velocity signal is achieved from the measured acceleration signal by integration in a manner fully known per se. Said integration can be included in the electronics part of the sensor 1, if desired.

The drawing and the related description are only intended to illustrate the inventive idea. As to its details, the invention may vary within the scope of the claims. Consequently, the means for measuring acceleration and pressure may be any kind of means known per se, as long as they are arranged concentrically in the same plane. The sensor may also be constructed by arranging the means for measuring pressure in the middle and the means for measuring acceleration e.g. in the shape of a ring around them. However, the preferable way to carry out the measurements has been described above. The sensor can be micromechanically made on silicon. The sensor 1 can, of course, be used e.g. only as a microphone or a mere acceleration sensor.

What is claimed is:

1. A sensor for measuring acceleration and sound pressure, the sensor separately comprising means for measuring the acceleration of a surface and means for measuring the sound pressure affecting the surface, wherein the means for measuring the acceleration and the means for measuring the sound pressure are arranged substantially concentrically and substantially in the same plane.

2. A sensor as claimed in claim 1, wherein the means for measuring pressure is annular and the means for measuring acceleration is disposed substantially in its middle.

3. A sensor as claimed in claim 1, wherein the means for measuring pressure comprises a pressure-sensitive film having flat gas bubbles and a metal coating on at least one side, and in which a permanent electric charge has been formed.

4. A sensor as claimed in claim 1, wherein the means for measuring acceleration comprises a pressure-sensitive film having flat gas bubbles and a metal coating on at least one side, and in which a permanent electric charge has been formed, a mass, arranged on top of the film, and a protective casing arranged around the film and the mass in order for sound pressure not to be able to substantially affect the film.

5. A sensor as claimed in claim 1, wherein the sensor comprises the electronics needed for signal processing.

6. A sensor as claimed in claim 5, wherein the sensor comprises a base plate into which a circuit containing the electronics needed for signal processing is integrated.

* * * * *